(12) United States Patent
Kodati

(10) Patent No.: US 12,539,968 B2
(45) Date of Patent: Feb. 3, 2026

(54) SELF-LOCKING MOUNTING INSERT

(71) Applicant: B/E AEROSPACE, INC., Winston Salem, NC (US)

(72) Inventor: Sambasiva Rao Kodati, Krishna District (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 445 days.

(21) Appl. No.: 17/972,988

(22) Filed: Oct. 25, 2022

(65) Prior Publication Data

US 2024/0010338 A1 Jan. 11, 2024

(30) Foreign Application Priority Data

Jul. 6, 2022 (IN) .............................. 202241038814

(51) Int. Cl.
*B64D 11/00* (2006.01)
(52) U.S. Cl.
CPC .................................... *B64D 11/00* (2013.01)
(58) Field of Classification Search
CPC ...................................................... B64D 11/00
See application file for complete search history.

(56) References Cited

U.S. PATENT DOCUMENTS

| | | | | |
|---|---|---|---|---|
| 3,951,444 A | * | 4/1976 | Shull | ........................ E05B 1/003 292/359 |
| 3,958,308 A | * | 5/1976 | Gooding | ................. F16B 21/02 411/554 |
| 5,485,733 A | * | 1/1996 | Hoffman | .................. E05B 65/46 70/276 |
| 5,533,237 A | * | 7/1996 | Higgins | ................ F16B 21/075 24/297 |
| 5,603,472 A | | 2/1997 | Hutter, III | |
| 6,676,176 B1 | * | 1/2004 | Quandt | ..................... E05B 9/08 292/202 |
| 9,387,912 B2 | | 7/2016 | Lee | |
| 9,593,699 B2 | * | 3/2017 | Giacalone | ............. H01F 7/0252 |
| 9,752,601 B2 | | 9/2017 | Giacalone et al. | |

(Continued)

FOREIGN PATENT DOCUMENTS

DE 4141573 6/1993
EP 3294371 3/2020

(Continued)

OTHER PUBLICATIONS

European Patent Office, European Search Report dated Nov. 23, 2023 in Application No. 23181548.1.

(Continued)

*Primary Examiner* — Mark A Williams
(74) *Attorney, Agent, or Firm* — SNELL & WILMER L.L.P.

(57) ABSTRACT

A self-locking mounting insert is provided for attaching a panel to a vehicle structure. A tab of the panel may be inserted into a keyway of the insert. The tab may slide between a latched and unlatched position within the keyway. When in the latched position, a latching member prevents the tab from being removed from the keyway. By moving a magnet proximate to the latching member, the latching member may be magnetically impelled to move to an unlatched position to permit the tab to be removed from the keyway.

18 Claims, 10 Drawing Sheets

(56) References Cited

U.S. PATENT DOCUMENTS

| | | | |
|---|---|---|---|
| 10,047,526 B2 | 8/2018 | Pantev | |
| 2012/0080890 A1* | 4/2012 | Loret de Mola | E05C 1/14 292/164 |
| 2013/0294863 A1* | 11/2013 | Tseng | F16B 5/0208 411/175 |
| 2014/0068921 A1* | 3/2014 | Tseng | F16B 5/0208 29/525.02 |
| 2014/0105707 A1* | 4/2014 | Tseng | F16B 21/04 411/508 |
| 2015/0147133 A1* | 5/2015 | Tseng | F16B 5/0208 411/132 |
| 2015/0247517 A1* | 9/2015 | Tseng | F16B 5/0208 411/166 |
| 2015/0292539 A1* | 10/2015 | Tseng | F16B 5/0208 411/132 |

FOREIGN PATENT DOCUMENTS

| | | | |
|---|---|---|---|
| GB | 1381917 A * | 1/1975 | F16B 21/04 |
| GB | 2174749 | 11/1986 | |

OTHER PUBLICATIONS

European Patent Office, European Office Action dated Jul. 9, 2025 in Application No. 23181548.1.

* cited by examiner

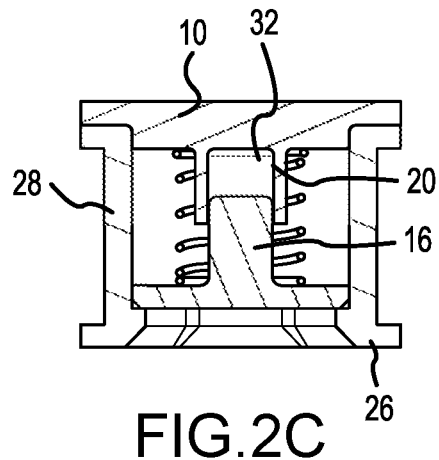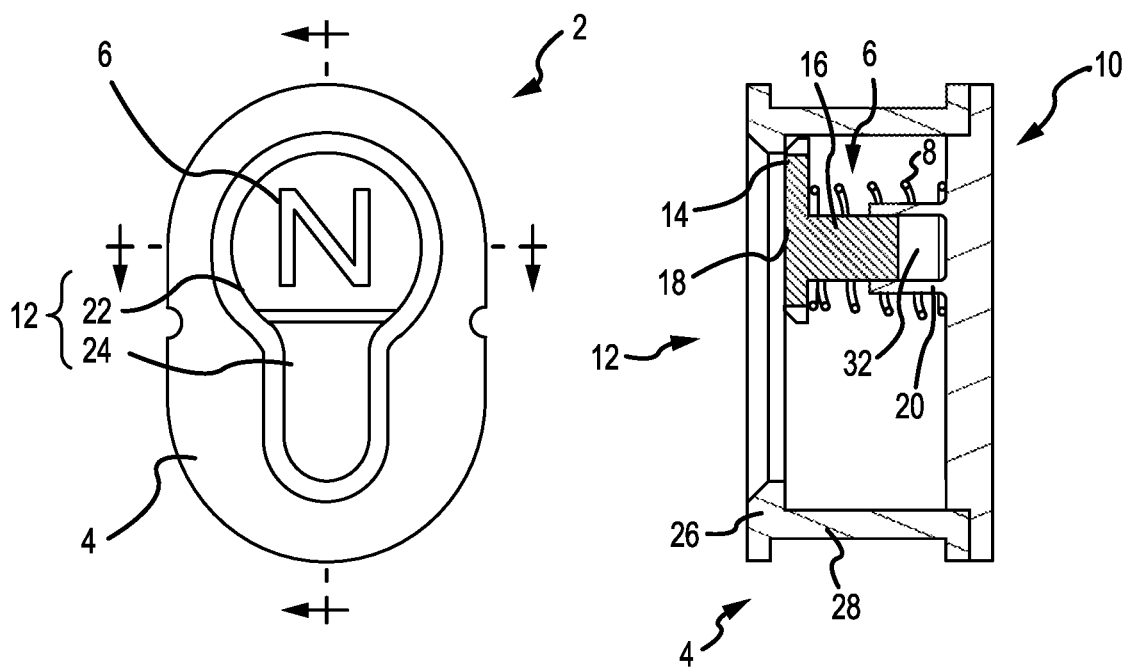

SELF-LOCKING MOUNTING INSERT

CROSS-REFERENCE TO RELATED APPLICATIONS

This application claims priority to, and the benefit of, India Patent Application No. 202241038814 (DAS CODE: BE92), filed Jul. 6, 2022, and titled "SELF-LOCKING MOUNTING INSERT," which is incorporated by reference herein in its entirety for all purposes.

FIELD

The present disclosure relates generally to a mounting insert and more particularly, to a self-locking mounting insert.

BACKGROUND

Frequently, interior panels in an interior area of a vehicle are attached to walls and/or other interior structures of the vehicle. However, fasteners such as screws or bolts may cause unsightly blemishes and inconsistencies on surfaces of the interior panels that are visible to passengers. Also, fasteners may be subject to tampering by passengers or others. Additionally, interior panels are often desired to be detached from the walls or structures of the vehicle during maintenance. Due to the size and shape of an interior panel, manipulating the panel to detach it may be difficult and may require multiple people, slowing maintenance operations.

SUMMARY

A self-locking mounting insert is provided. The self-locking mounting insert may include a main body, a latching member, a backplate, and a spring. The main body may have a front face and a sidewall extending from an edge of the front face to define a hollow boss. A keyway is defined through the front face to provide an opening into the hollow boss. The latching member may be disposed in the hollow body and may have a flange at least partially occluding the keyway. The backplate may be a plate attached to the sidewall of the main body. The spring may be disposed between the backplate and the latching member to urge the latching member toward the keyway to at least partially occlude the keyway.

The latching member may also include a guide boss extending from the flange of the latching member toward the backplate. The backplate may also include a guide channel to receive the guide boss into the guide channel. In various embodiments, the guide channel is a cylindrical boss having a cylindrical opening and the guide boss is a cylindrical boss sized to be received into the cylindrical opening. In various embodiments, the spring is disposed annularly about the guide channel and the guide boss and between the latching member and the backplate.

The latching member may be magnetic. The latching member may be configured to be repelled by a magnetic tool and compress the spring in response to the magnetic tool being positioned proximate to the latching member. The latching member may be a magnet configured to interact with a magnetic tool to compress the spring, and wherein the main body and/or a tab of a panel inserted into the keyway includes a ferromagnetic portion configured to interact with the magnetic tool to attract the tool to the self-locking mounting insert and hold the tool in position adjacent to the self-locking mounting insert.

The keyway may include an insertion portion defining a larger aperture and a retention portion defining a smaller aperture connected to the larger aperture. A tab of a panel securable to the self-locking mounting insert is receivable into the insertion portion of the keyway, and slidably retainable in the retention portion of the keyway by the latching member.

The main body may have various shapes. The main body may be cylindrical. The main body may be oval. The main body may be an elongated circle having two semicircular ends joined by parallel straight sides.

An aircraft interior panel is disclosed. The panel may have a panel member and a tab. The panel member may be configured to provide an interior surface of an aircraft cabin. The tab may extend from a rear surface of the panel member and may be configured to be received into a corresponding self-locking mounting insert of an aircraft to secure the panel member in fixed orientation. In various embodiments, the self-locking mounting insert of the aircraft includes further features.

For instance, the self-locking mounting insert may include a main body, a latching member, a backplate, and a spring. The main body may have a front face and a sidewall extending from an edge of the front face to define a hollow boss. A keyway may be defined through the front face to provide an opening into the hollow boss. The latching member may be disposed in the hollow body and may have a flange at least partially occluding the keyway. The backplate may be a plate attached to the sidewall of the main body. The spring may be disposed between the backplate and the latching member to urge the body of the latching member toward the keyway to at least partially occlude the keyway. The tab may be received into the keyway and trapped in the keyway by the latching member.

An aircraft interior panel mounting system is provided. The system may include a structural wall panel. The structural wall panel may have a plurality of self-locking mounting inserts attached thereto; each self-locking mounting insert of the plurality of self-locking mounting inserts configured to receive a corresponding tab of an aircraft interior panel to secure the aircraft interior panel in fixed orientation.

The self-locking mounting insert of the aircraft has various features. The self-locking mounting insert may have a main body and a latching member. The main body may have a front face and a sidewall extending from an edge of the front face to define a hollow boss. A keyway is defined through the front face to provide an opening into the hollow boss. The latching member is disposed in the hollow body and has a flange at least partially occluding the keyway. The tab is received into the keyway and trapped in the keyway by the latching member.

The aircraft interior panel mounting system may have other features. For instance, the self-locking mounting insert may further include a spring to urge the body of the latching member toward the keyway to at least partially occlude the keyway. The latching member may be magnetic. The system may include a magnetic tool configured to be positioned adjacent the aircraft interior panel to repel the latching member from the keyway so that the tab may be removed from the keyway and the aircraft interior panel disconnected from the self-locking mounting insert of the aircraft. The main body and/or the tab may also include a ferromagnetic portion configured to interact with the magnetic tool to attract the tool to the self-locking mounting insert and hold the tool in position against the aircraft interior panel and adjacent to the self-locking mounting insert.

The keyway may include an insertion portion defining a larger aperture and a retention portion defining a smaller aperture connected to the larger aperture. The tab may be receivable into the insertion portion of the keyway, and slidably retainable in the retention portion of the keyway by the latching member. In various embodiments, the front face of the main body is coplanar with a surface of the aircraft structural panel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 2A illustrates a front view of an example self-locking mounting insert, in accordance with various embodiments;

FIGS. 2B-2C illustrate section views of an example self-locking mounting insert, in accordance with various embodiments;

DETAILED DESCRIPTION

Figure 1:
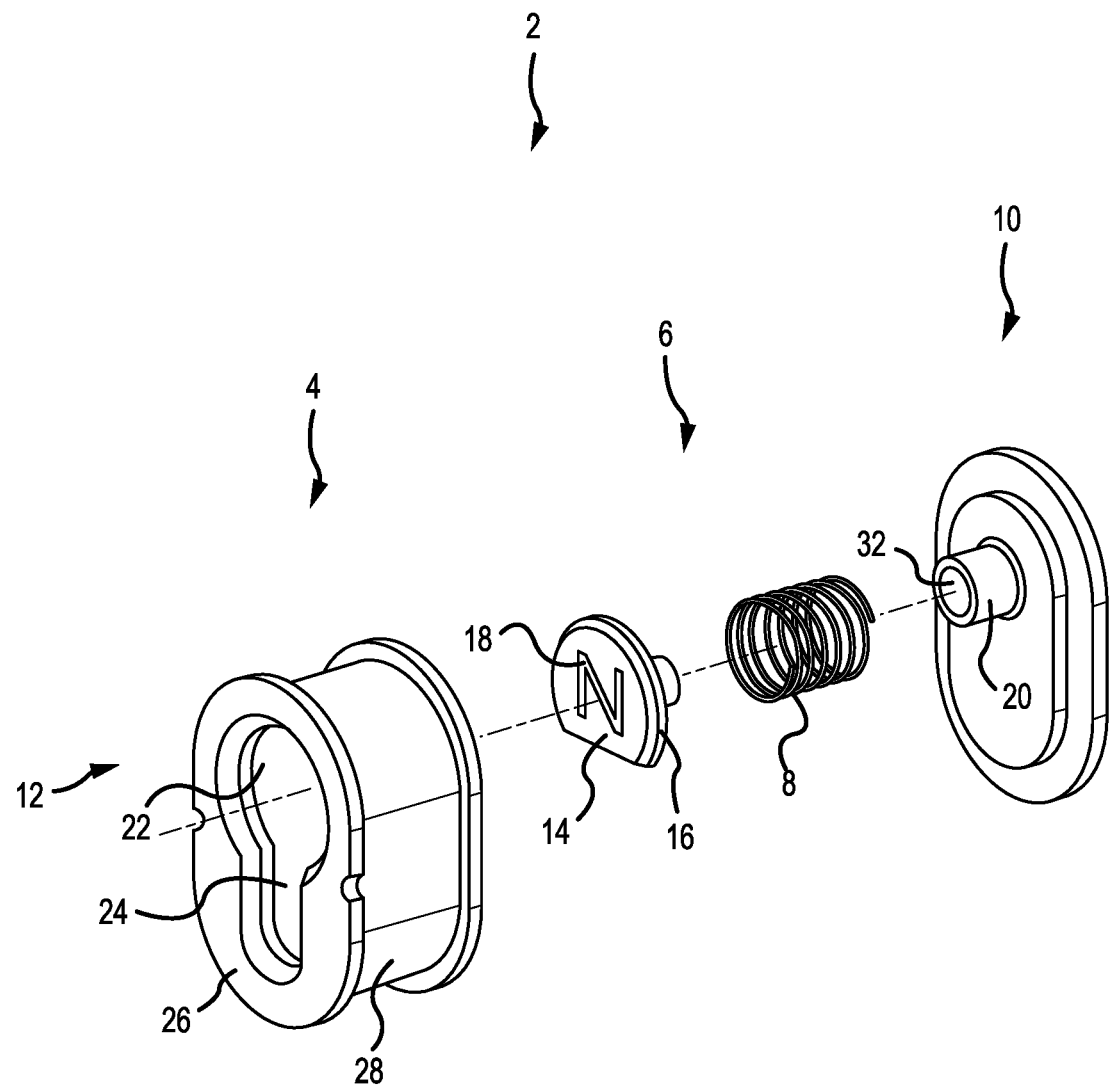
FIG. 1 illustrates an exploded view of an example self-locking mounting insert, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

With reference to FIGS. 1 and 2A-C, an example self-locking mounting insert 2 is depicted. The self-locking mounting insert 2 may have a main body 4. The main body 4 may provide a structure to support other aspects of the self-locking mounting insert 2 and to attach to another structure. The self-locking mounting insert 2 may have a latching member 6. The latching member 6 may be disposed inside a space defined by the main body 4. The latching member 6 may move between different positions. For instance, the latching member 6 may move between a latched position and an unlatched position. In the latched position, the latching member 6 may secure another structure to the main body 4 and in an unlatched position, the latching member 6 may permit the other structure to be disconnected from the main body 4. In this manner, the self-locking mounting insert 2 may selectably disconnect or connect at least two structures. For instance, the self-locking mounting insert 2 may be mounted on an interior structure of an aircraft and may selectably attach a surface panel to the interior structure.

The self-locking mounting insert 2 may have a backplate 10. The backplate 10 may be a plate that attaches to the main body 4 to form an at least partial enclosure holding the latching member 6 therein.

The self-locking mounting insert 2 may have a spring 8. The spring 8 may be between the backplate 10 and the latching member 6. The spring 8 may urge the latching member 6 toward a front face 26 of the main body 4. The spring 8 may be compressible. The spring 8 may urge the latching member 6 to remain in the latched position. The spring 8 may urge the latching member 6 to remain in the unlatched position. The spring 8 may urge the latching member 6 to resist transitioning between the latched and unlatched positions, so that the self-locking mounting insert 2 does not inadvertently become latched or unlatched.

The main body 4 may include further features. For instance, the main body 4 may have a front face 26 and a sidewall 28 extending from an edge of the front face 26 to define a hollow boss. In various instances, the front face 26 is positioned co-planar with a face of a structural wall panel 3 of an aircraft (FIGS. 8-10) to which the main body 4 is secured. The backplate 10 may be a plate attached to the sidewall 28 of the main body 4. A hollow space may be defined by the front face 26, sidewall 28, and backplate 10 and the latching member 6 may be disposed inside the space provided by the hollow body. The front face 26 of the main body 4 may have one or more opening. For instance, the front face 26 of the main body 4 may include a keyway 12.

The keyway 12 may include a larger opening portion and a smaller opening portion that combine to form a single opening having varying dimension. For instance, a keyway 12 may have an insertion portion 22 and a retention portion 24. An insertion portion 22 may be larger to permit an article desired to be retained by the self-locking mounting insert 2 to be inserted into the main body 4. A retention portion 24 may be smaller to permit the article to be retained in mechanical connection to the main body 4 after insertion. For instance, the inserted article may be slidably moved from the insertion portion 22 to the retention portion 24 and be retained thereby. The self-locking mounting insert 2 may have a spring 8 disposed between the backplate 10 and the latching member 6 to urge the latching member 6 toward the keyway 12 to at least partially occlude the keyway 12. By occluding the keyway 12, the latching member 6 facilitates retention of the inserted article in the retention portion 24 and blocks the inserted article from sliding back to the insertion portion 22 and being removed from mechanical connection with the self-locking mounting insert 2.

The main body 4 may have a variety of different possible shapes. For instance, the main body 4 may be cylindrical. The main body 4 may be oval. In further instances, the main body 4 may be an elongated circle shape having two semicircular ends joined by parallel straight lines. Other shapes are also possible.

The latching member 6 may have further features. For instance, a guide boss 16 may be provided. The guide boss 16 may be a boss that extends from the flange 14 of the latching member 6 toward the backplate 10. The backplate 10 may have a corresponding guide channel 20. The guide channel 20 defines an opening 32 that receives the guide boss 16 into the guide channel 20. In various instances, the guide boss 16 is spaced apart from the guide channel 20 until the spring 8 is depressed, then the guide boss 16 is received at least partially into the guide channel 20.

The guide channel 20 may be a cylindrical boss having a cylindrical opening 32 defined in an end of the cylindrical boss. However, other shapes such as trapezoidal, oval, or others may be contemplated. The guide boss 16 may also be a cylindrical boss that is sized to be received into the cylindrical opening 32. Again, however, other shapes may be contemplated such as trapezoidal shapes, oval shapes, or others.

The guide channel 20 and/or guide boss 16 may also assist in orienting the spring 8. For instance, the spring 8 may be disposed annularly about the guide channel 20 and the guide boss 16 and may be sandwiched between the latching member 6 and the backplate 10.

The latching member 6 has various further features as well. For instance, the latching member 6 may be at least partially magnetic. The latching member 6 may be configured to have a same magnetic polarity as a tool that can be brought near the latching member 6. In response to the tool being brought near the latching member 6, the latching member 6 may be repelled by the tool and compress the spring 8 in response to the magnetic tool being positioned proximate to the latching member 6.

The main body 4 may also have a portion that is ferromagnetic, but not magnetized. The ferromagnetic portion may be configured to interact with the magnetic tool to attract the tool to the self-locking mounting insert 2 and hold the tool in position adjacent to the self-locking mounting insert 2 while the latching member 6 is being repelled by the tool and causing the spring 8 to compress.

Figure 3:
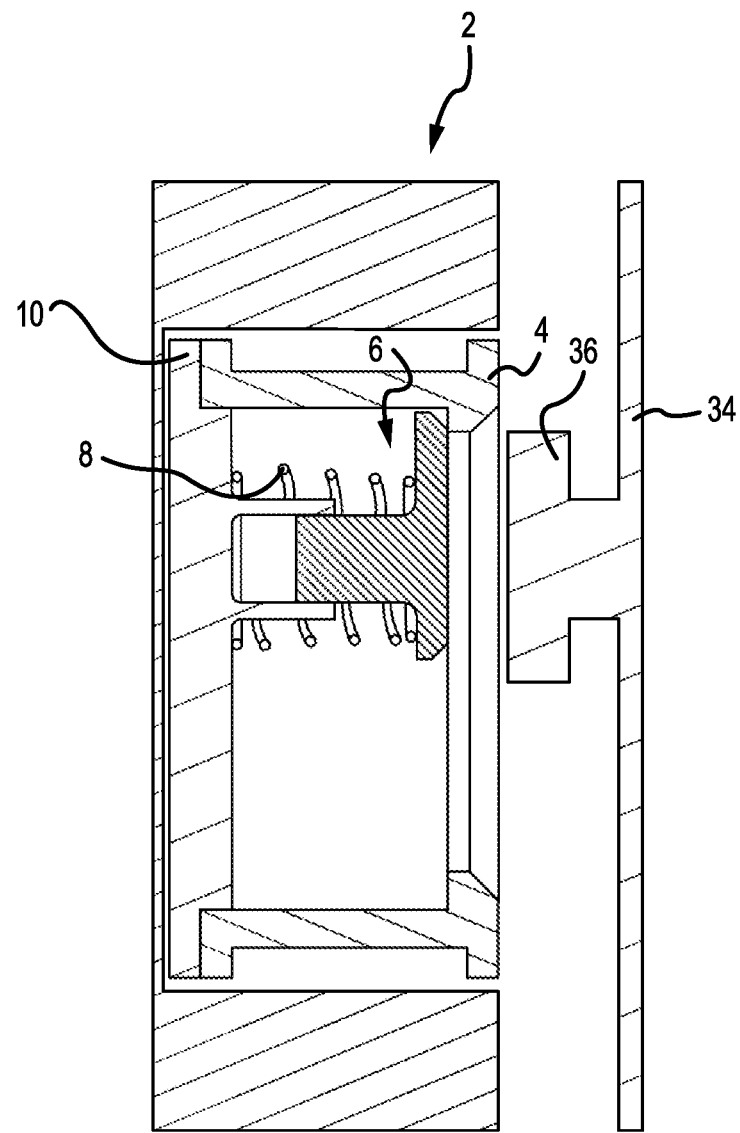
FIG. 3 illustrates a self-locking mounting insert and a panel having a tab prior to the tab being inserted into the insert, in accordance with various embodiments.

Turning to FIGS. 3-7, an illustration is provided of a self-locking mounting insert 2 having a main body 4, latching member 6, spring 8 and backplate 10 while the self-locking mounting insert 2 is in various relations to a panel 34 that is being mounted to the self-locking mounting insert 2. In FIG. 3, the self-locking mounting insert 2 is near to a panel 34 that is being mounted to the self-locking mounting insert 2. For instance, the panel 34 may be an aircraft interior panel. The panel 34 includes a tab 36. A tab 36 is a protrusion extending from a rear side of the panel 34 for interfacing with the self-locking mounting insert 2. In various embodiments, the tab 36 is inserted into a keyway 12 of a front face 26 of the main body 4 of the self-locking mounting insert 2. For instance, the tab 36 may be inserted into an insertion portion 22 of the keyway 12 and then slidably moved to a retention portion 24. A series of Figures illustrating the inserting and sliding aspects is provided herein.

Figure 4:
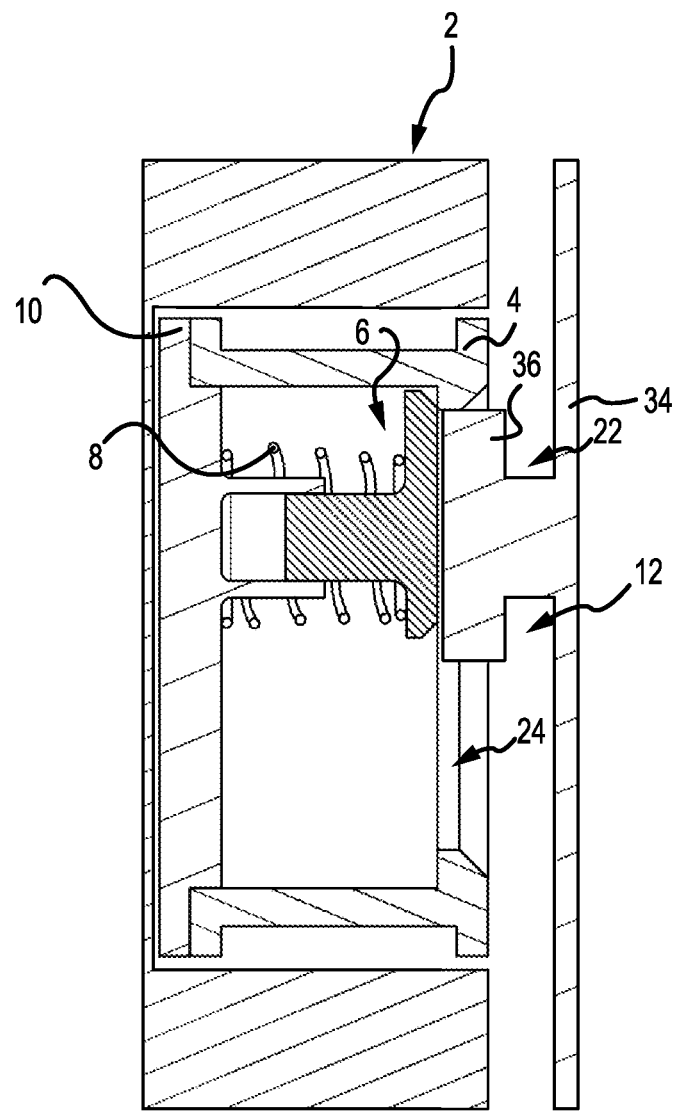
FIG. 4 illustrates a self-locking mounting insert and a panel having a tab with the tab partially inserted into the insertion portion of the keyway of the insert, in accordance with various embodiments.
Figure 5:
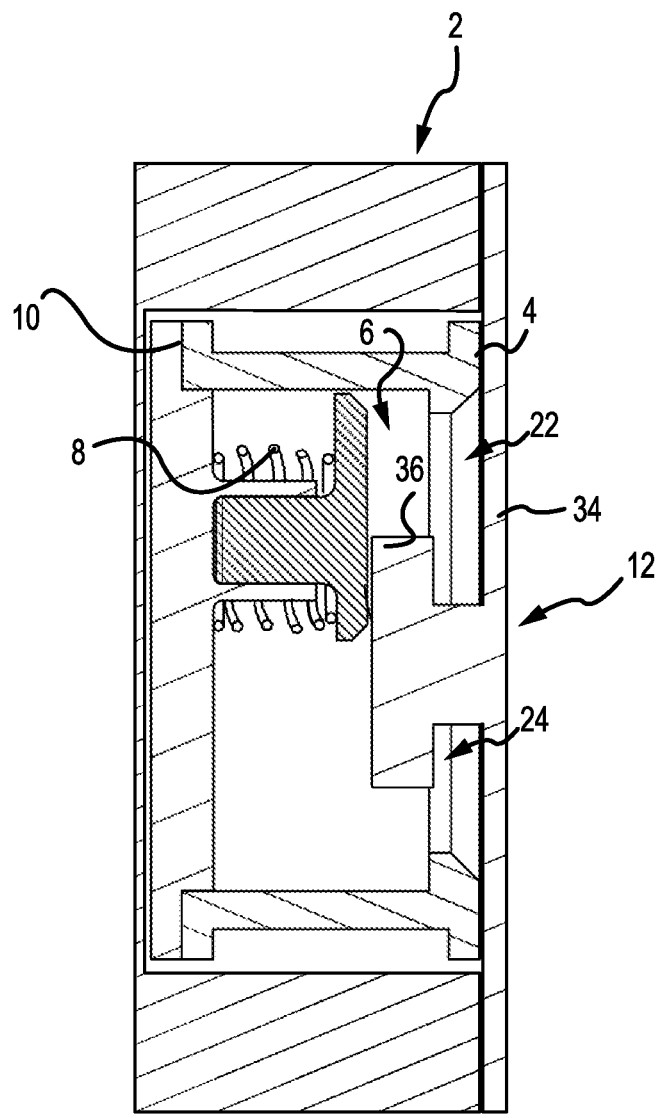
FIG. 5 illustrates a self-locking mounting insert and a panel having a tab with the tab inserted into the keyway of the insert and part way between the insertion portion of the keyway of the insert and a retention portion of the keyway of the insert, in accordance with various embodiments.
Figure 6:
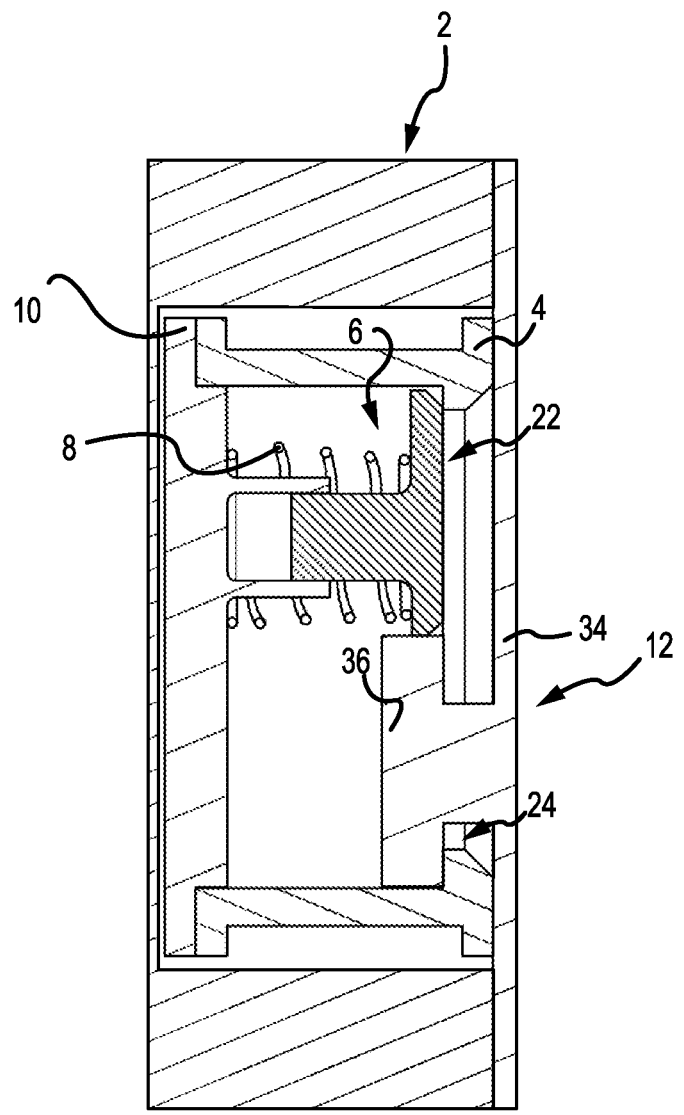
FIG. 6 illustrates a self-locking mounting insert and a panel having a tab with the tab inserted into the retention portion of the keyway of the insert, in accordance with various embodiments.

Turning now to FIG. 4, a panel 34 is illustrated having a tab 36 inserted into an insertion portion 22 of a keyway 12, but with the latching member 6 of the self-locking mounting insert 2 in an unlatched condition. FIG. 5 illustrates a panel 34 having a tab 36 inserted into the insertion portion 22 of the keyway 12 with the latching member 6 of the self-locking mounting insert 2 mid-transition from the insertion portion 22 to the retention portion 24. FIG. 6 illustrates a panel 34 having a tab 36 inserted into the retention portion 24 of the keyway 12 after the tab 36 has been slidably moved from the insertion portion 22 to the retention portion 24. Notably, in FIG. 4-5, the spring 8 is at least partially compressed by the tab 36 pressing the latching member 6 back toward the backplate 10, but in FIG. 6, the tab 36 has been moved fully into the retention portion 24 of the keyway 12, relieving the mechanical interference between the latching member 6 and permitting the latching member 6 to extend under the influence of the spring 8 to block any return of the tab 36 into the insertion portion 22. In this manner, the latching member 6 may be said to now be in the latched position.

Figure 7:
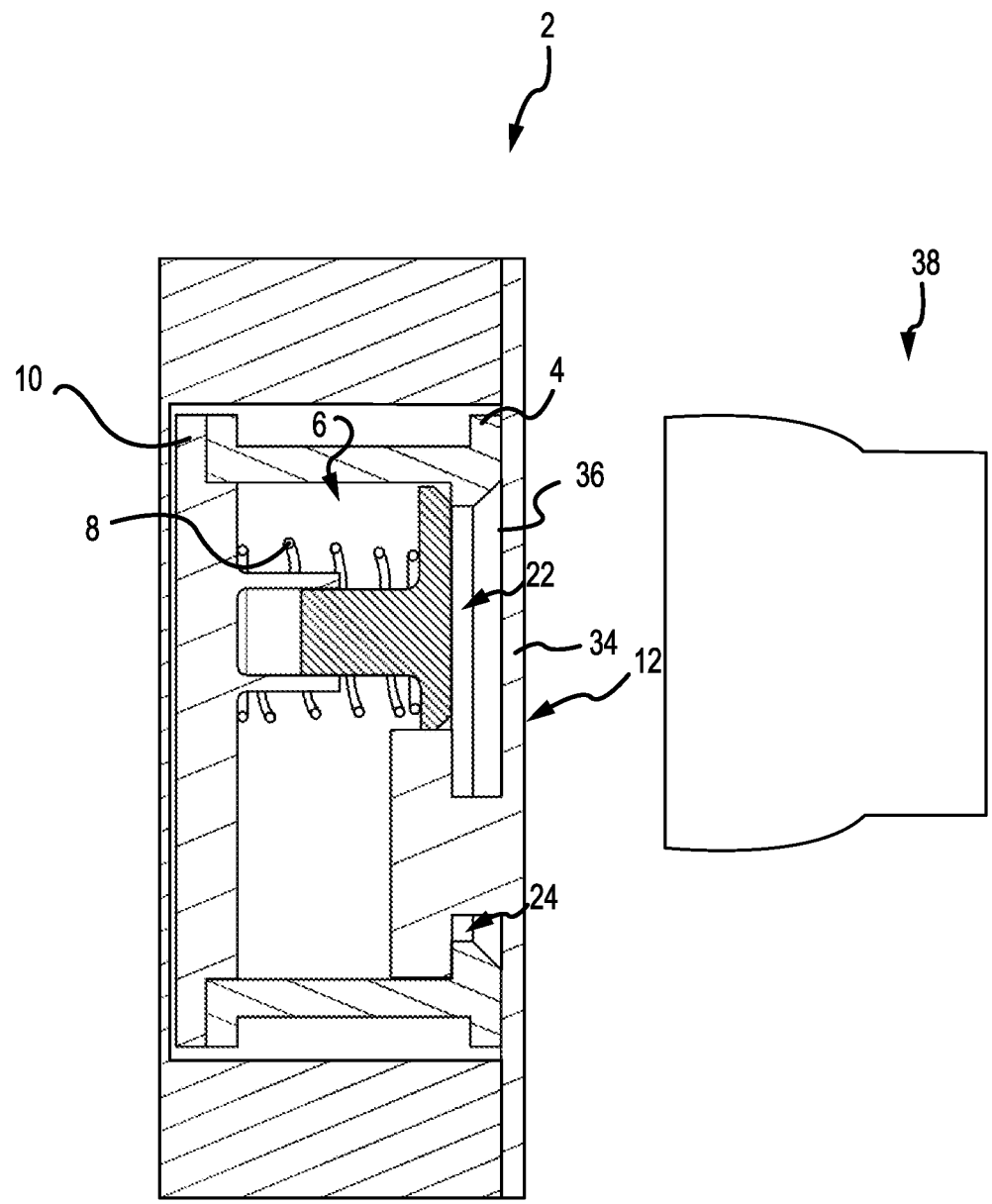
FIG. 7 illustrates a self-locking mounting insert and a panel having a tab with the tab inserted into the retention portion of the keyway of the insert as well as a tool for use unlatching the self-locking mounting insert from the tab, in accordance with various embodiments.

FIG. 7 illustrates a panel 34 having a tab 36 inserted into the retention portion 24 of a keyway 12 and latched into position. To unlatch the self-locking mounting insert 2 to facilitate disconnection of the panel 34 (and tab 36) from the self-locking mounting insert 2, a tool 38 is brought into physical proximity to the self-locking mounting insert 2. The tool 38 is magnetic and interacts with a magnet 18 of the latching member 6, to cause the latching member 6 to be repulsed away from the tool 38, compressing the spring 8 and causing the latching member 6 to move into a position that does not block the tab 36 from slidably moving to the insertion portion 22 of the keyway 12 and then being removed therefrom (e.g., an unlatched position). In various embodiments, the tab 36 includes a ferromagnetic material. The ferromagnetic material of the tab 36 attracts the tool 38 and holds the tool 38 in fixed orientation relative to the tab 36 so that when the tab 36 is inserted into the keyway 12, the tool 38 also is pre-positioned to exert repulsive force on the latching member 6 to cause the latching member 6 to be repulsed and moved into an unlatched position.

Figure 8:
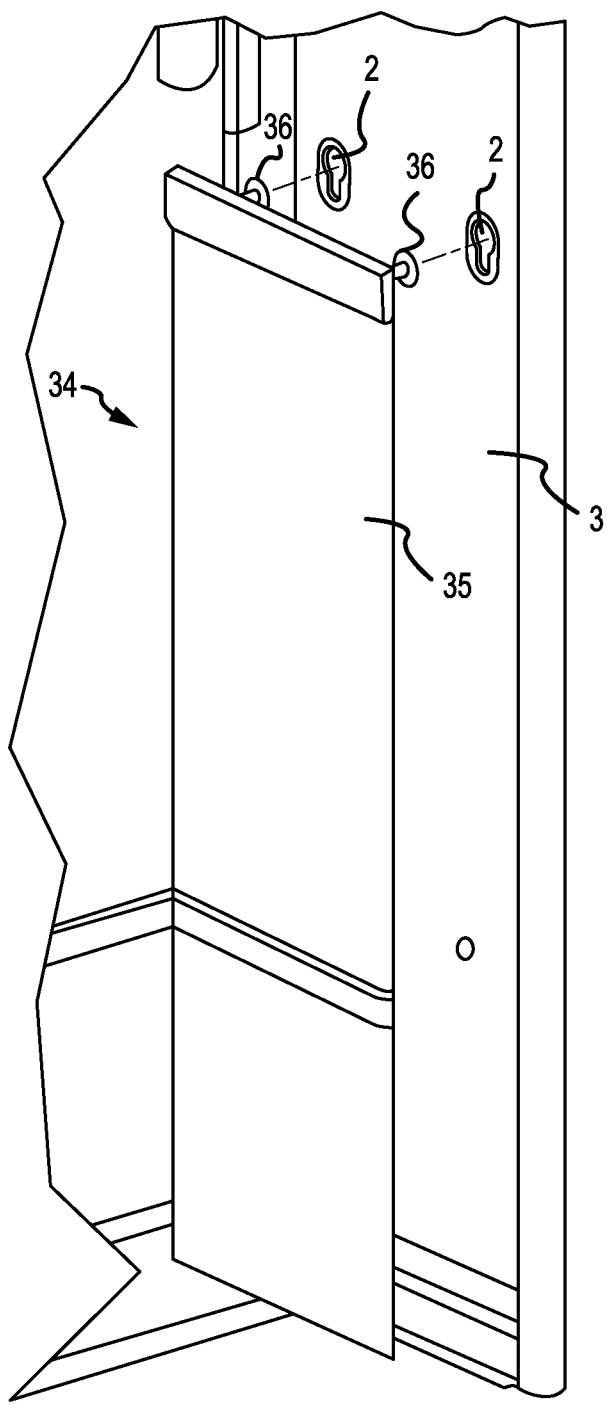
FIGS. 8-10 illustrate example aircraft interior panels having tabs and corresponding self-locking mounting inserts to receive the tabs and secure the aircraft interior panels to an aircraft, in accordance with various embodiments.
Figure 9:
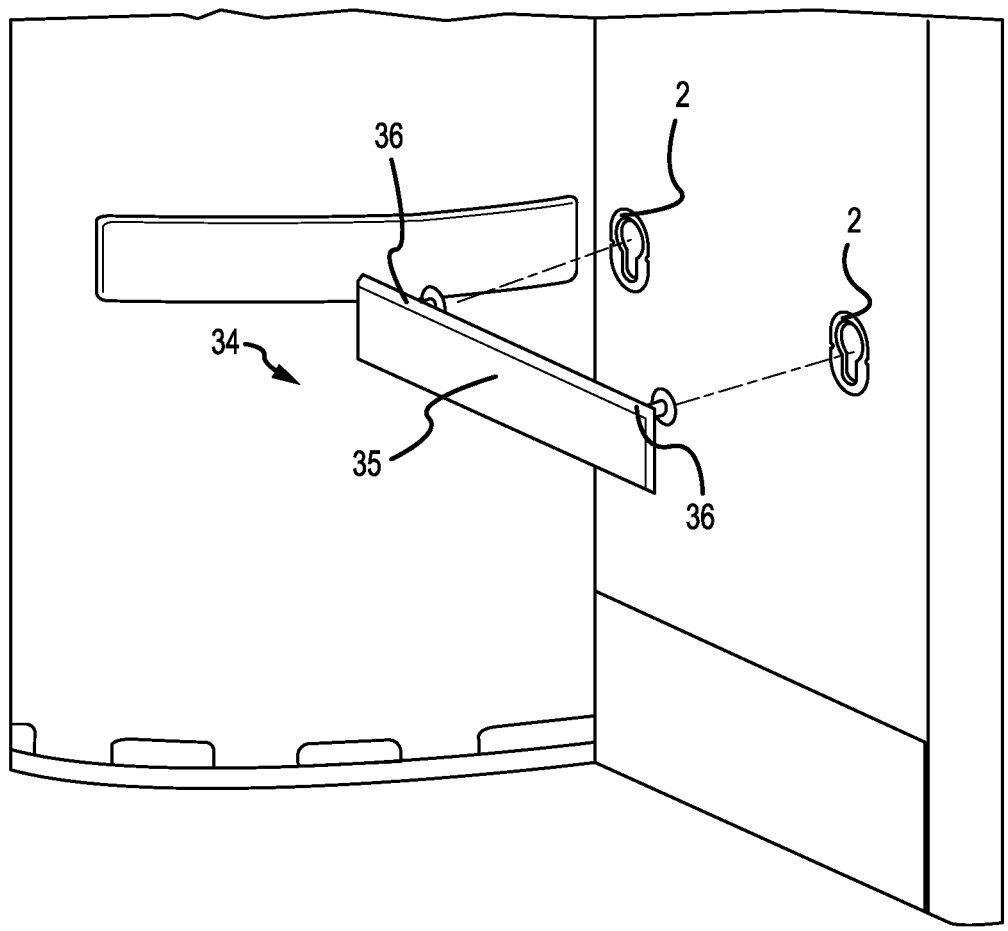
Figure 10:
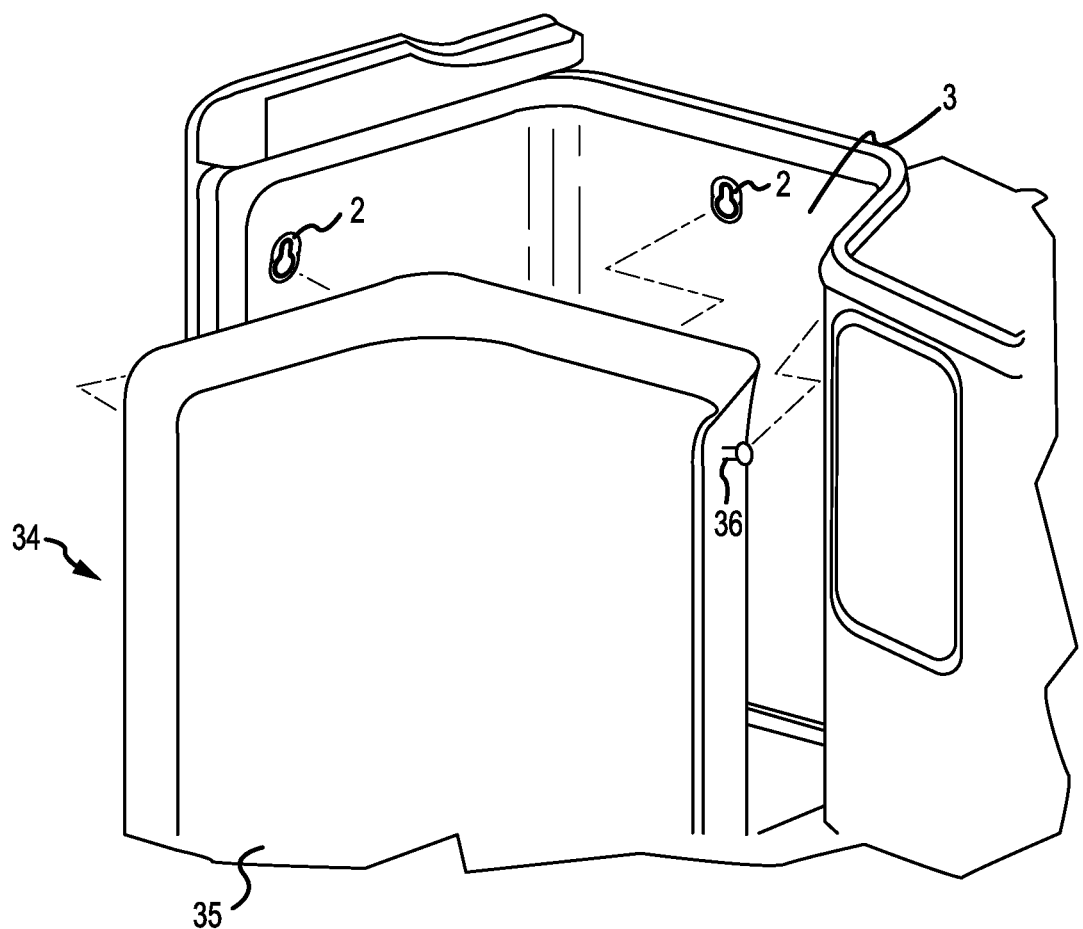

FIGS. 8, 9, and 10 each show a different example panel 34 having a panel member 35 that provides an interior surface of an aircraft cabin and having multiple tabs 36 extending from the panel member 35. The panel 34, and specifically, the tabs 36 of the panel 34 connect to self-locking mounting inserts 2 attached to a structure of the aircraft. In the illustrations, the tabs 36 may be inserted into a keyway of the self-locking mounting inserts 2 and then slidably translated downwardly, to transition the self-locking mounting inserts 2 from unlatched to latched configurations.

With reference to the combination of FIGS. 1-10, different embodiments of a panel 34 may be contemplated. A panel 34, such as an aircraft interior panel, may include a panel member 35 configured to provide an interior surface of an aircraft cabin. The panel 34 may also have a tab 36 extending from a rear surface of the panel member 35 and configured to be received into a corresponding self-locking mounting insert 2 of an aircraft to secure the panel 34 in fixed orientation. The self-locking mounting insert 2 of the aircraft includes aspects detailed herein above. For instance, the self-locking mounting insert 2 may have a main body 4 comprising a front face 26 and a sidewall 28 extending from an edge of the front face 26 to define a hollow boss. A keyway 12 is defined through the front face 26 to provide an opening into the hollow boss. A latching member 6 is disposed in the hollow body and comprising a flange 14 at least partially occluding the keyway 12. A backplate 10 provides a plate attached to the sidewall 28 of the main body 4. A spring 8 disposed between the backplate 10 and the latching member 6 urges the latching member 6 toward the keyway 12 to at least partially occlude the keyway 12. The tab 36 is received into the keyway 12 and trapped in the keyway 12 by the latching member 6.

In another instance, an aircraft interior panel mounting system is provided. The system includes a structural wall panel 3 having a plurality of self-locking mounting inserts 2 attached thereto, each self-locking mounting insert 2 of the plurality of self-locking mounting inserts 2 configured to receive a corresponding tab 36 of a panel 34 to secure the panel 34 in fixed orientation. The self-locking mounting insert 2 of the aircraft may have a main body 4 with a front face 26 and a sidewall 28 extending from an edge of the front face 26 to define a hollow boss. A keyway 12 is defined through the front face 26 to provide an opening into the hollow boss. A latching member 6 is disposed in the hollow body and includes a flange 14 at least partially occluding the keyway 12. The tab 36 is received into the keyway 12 and trapped in the keyway 12 by the latching member 6.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A self-locking mounting insert comprising:
a main body comprising a front face and a sidewall extending from an edge of the front face to define a hollow boss, wherein a keyway is defined through the front face to provide an opening into the hollow boss, wherein the keyway comprises an insertion portion defining a larger aperture and a retention portion defining a smaller aperture connected to the larger aperture;
a latching member disposed in the hollow boss and comprising a flange at least partially occluding the keyway;
a backplate comprising a plate attached to the sidewall of the main body; and
a spring disposed between the backplate and the latching member to bias the latching member toward the keyway to at least partially occlude the larger aperture in response to receiving a tab into the smaller aperture.

2. The self-locking mounting insert according to claim 1, wherein the latching member further comprises a guide boss extending from the flange of the latching member toward the backplate, and wherein the backplate comprises a guide channel to receive the guide boss into the guide channel.

3. The self-locking mounting insert according to claim 2, wherein the guide channel comprises a cylindrical boss having a cylindrical opening and the guide boss comprises a cylindrical boss sized to be received into the cylindrical opening.

4. The self-locking mounting insert according to claim 3, wherein the spring is disposed annularly about the guide channel and the guide boss and between the latching member and the backplate.

5. The self-locking mounting insert according to claim 1, wherein the latching member is magnetic.

6. The self-locking mounting insert according to claim 5, wherein the latching member is configured to be repelled by a magnetic tool and compress the spring in response to the magnetic tool being positioned proximate to the latching member.

7. The self-locking mounting insert according to claim 1, wherein the latching member comprises a magnet configured to interact with a magnetic tool to compress the spring, and wherein the main body further comprises a ferromagnetic portion configured to interact with the magnetic tool to attract the magnetic tool to the self-locking mounting insert and hold the magnetic tool in position adjacent to the self-locking mounting insert.

8. The self-locking mounting insert according to claim 1, wherein the tab is coupled to a panel and is slidably retainable in the retention portion of the keyway by the latching member.

9. The self-locking mounting insert according to claim 1, wherein the main body is cylindrical.

10. The self-locking mounting insert according to claim 1, wherein the main body is oval.

11. The self-locking mounting insert according to claim 1, wherein the main body is an elongated circle having two semicircular ends joined by parallel straight sides.

12. An aircraft interior panel comprising:
 a panel member configured to provide an interior surface of an aircraft cabin;
 a tab extending from a rear surface of the panel member and configured to be received into a corresponding self-locking mounting insert of an aircraft to secure the panel member in fixed orientation,
 wherein the self-locking mounting insert of the aircraft comprises:
  a main body comprising a front face and a sidewall extending from an edge of the front face to define a hollow boss, wherein a keyway is defined through the front face to provide an opening into the hollow boss, wherein the keyway comprises an insertion portion defining a larger aperture and a retention portion defining a smaller aperture connected to the larger aperture;
  a latching member disposed in the hollow boss and comprising a flange at least partially occluding the keyway;
  a backplate comprising a plate attached to the sidewall of the main body; and
  a spring disposed between the backplate and the latching member to bias the flange of the latching member toward the keyway to at least partially occlude the keyway in response to the tab being received into the smaller aperture such that the tab is trapped in the smaller aperture by the latching member occluding the larger aperture.

13. An aircraft interior panel mounting system comprising:
 a structural wall panel having a plurality of self-locking mounting inserts attached thereto, each self-locking mounting insert of the plurality of self-locking mounting inserts configured to receive a corresponding tab of an aircraft interior panel to secure the aircraft interior panel in fixed orientation,
 wherein the self-locking mounting insert comprises:
  a main body comprising a front face and a sidewall extending from an edge of the front face to define a hollow boss, wherein a keyway is defined through the front face to provide an opening into the hollow boss; and
  a latching member disposed in the hollow boss and comprising a flange at least partially occluding the keyway,
   wherein the keyway comprises an insertion portion defining a larger aperture and a retention portion defining a smaller aperture connected to the larger aperture, wherein the tab is received into the keyway and trapped in the smaller aperture of the keyway by the latching member, the latching member mechanically biased toward the keyway and obstructing the larger aperture of the keyway.

14. The aircraft interior panel mounting system according to claim 13, wherein the self-locking mounting insert further comprises a spring, wherein the latching member is mechanically biased toward the keyway by the spring such that the flange of the latching member at least partially occludes the keyway.

15. The aircraft interior panel mounting system according to claim 14, wherein the latching member is magnetic, the system further comprising a magnetic tool configured to be positioned adjacent the aircraft interior panel to repel the latching member from the keyway so that the tab may be removed from the keyway and the aircraft interior panel disconnected from the self-locking mounting insert.

16. The aircraft interior panel mounting system according to claim 15, wherein the tab includes a ferromagnetic portion configured to interact with the magnetic tool to attract the magnetic tool and hold the magnetic tool in position against the aircraft interior panel and adjacent to the self-locking mounting insert.

17. The aircraft interior panel mounting system according to claim 16, wherein the tab is receivable into the insertion portion of the keyway, and slidably retainable in the retention portion of the keyway by the latching member.

18. The aircraft interior panel mounting system according to claim 13, wherein the front face of the main body is coplanar with a surface of the structural wall panel.

\* \* \* \* \*